May 20, 1941.   L. P. BRICE ET AL   2,242,846
REINFORCED CONCRETE TANK
Filed Feb. 13, 1939   2 Sheets-Sheet 2
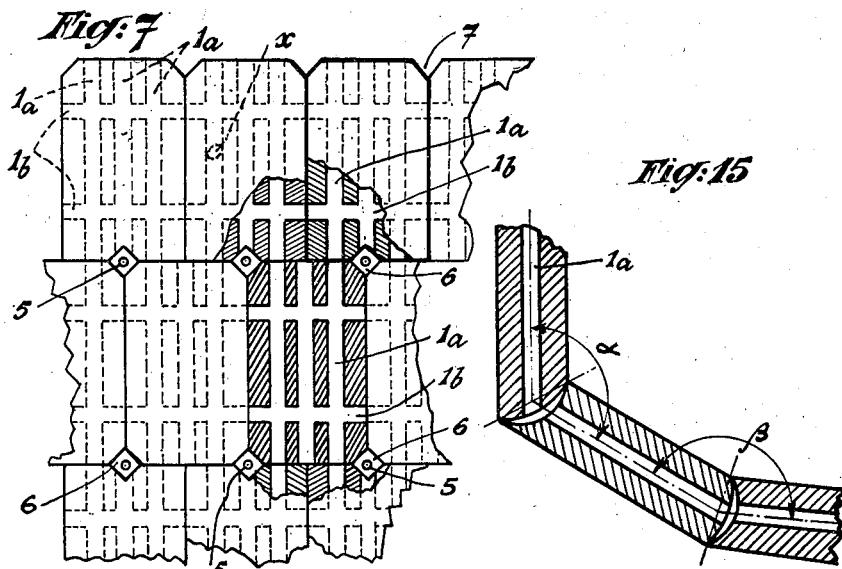
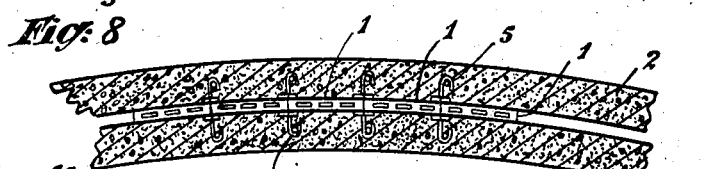
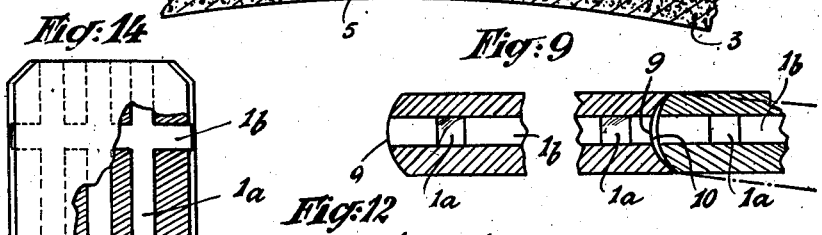
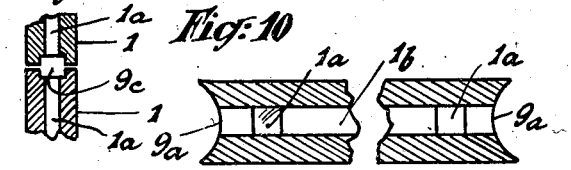
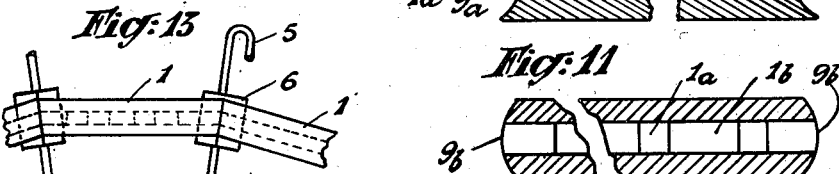
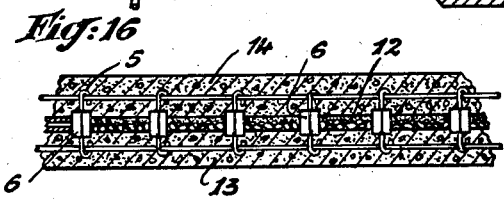

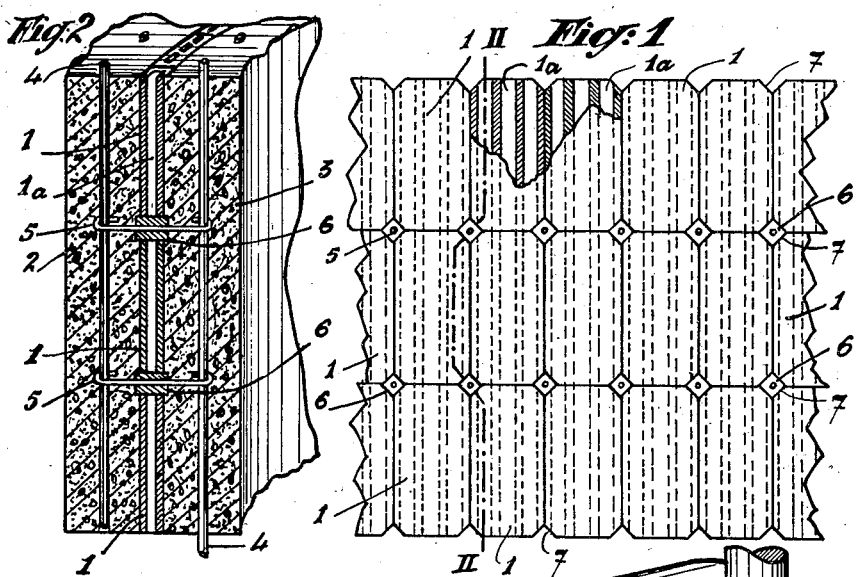
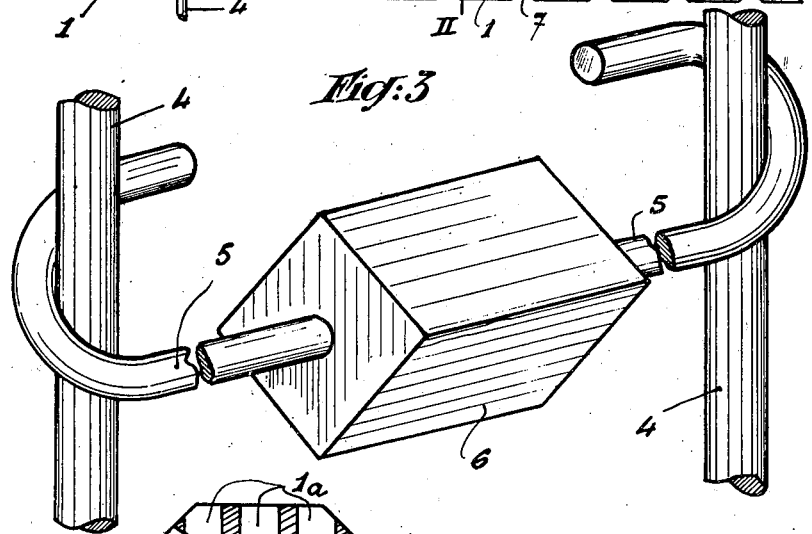
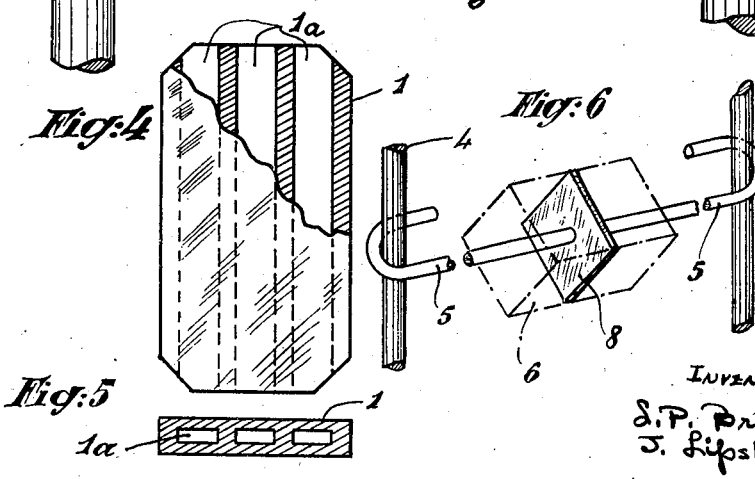

Patented May 20, 1941

2,242,846

UNITED STATES PATENT OFFICE 2,242,846

REINFORCED CONCRETE TANK

Louis Pierre Brice, Boulogne-sur-Seine, and Jean Lipsky, Paris, France, assignors to Société Anonyme: La Paroi Hydraulique, Paris, France, a company of France Application February 13, 1939, Serial No. 256,208 In Belgium February 18, 1938

9 Claims. (Cl. 72—14)

The present invention relates to the construction of reinforced concrete, thoroughly fluid tight, tanks which are provided in the concrete wall, with recesses or channels intended to be filled with a liquid which opposes any leakage of the fluid present in said concrete tanks.

This fluid may consist of a liquid of a density lower than that of the liquid present in said channels and which does not mix with said last mentioned liquid, or again a gas which is not soluble in this liquid and the pressure of which is lower.

The most interesting case is that in which the tank is intended to contain hydrocarbons such as gasoline. In this case, the liquid present in the channels or recesses may consist of water.

In actual practice, the channels in question are obtained by providing, between two walls of reinforced concrete which constitute the internal and external faces of the tank, hollow porous bodies, such for instance as hollow bricks the cavities of which communicate together.

The strength of the hollow bodies may be insufficient for transmitting the stresses that are exerted by the two faces of the wall on each other, which would involve the risk of injuring said wall.

The object of the present invention is to provide a tank of the type above described which avoids this drawback.

With this object in view, according to an essential feature of the present invention, and also in order to ensure a very strong intimate connection between the two concrete wall elements while preventing the possibility of leakage, these two wall elements are interconnected by strutting pieces, anchored in said wall elements and of a section corresponding to that of the holes provided in the series of hollow bodies for the passage of these strutting pieces, whereby there are no interstices sufficient for allowing concrete to flow between the strutting pieces and the hollow bodies and thus to clog the channels of the hollow bodies and to involve risks of leakage of the fluid present in the concrete tank.

According to another feature of the present invention, in order to ensure a good transmission of stresses of all kinds between the two concrete walls, to prevent leakage at the places where the strutting pieces are located and to protect the metal of these strutting pieces, it is very advantageous to surround in advance the median portion of the strutting pieces with a product such as concrete or cement or terra cotta and to give this surrounding mass a shape such that it fits, without detrimental play, the shape of the holes or recesses provided in the hollow bodies, for instance by cutting off the edges of these bodies and providing notches at the suitable places.

Another feature of the present invention consists in the provision of hollow bodies of particular shape which permit of obtaining a good continuity of the fluid tight liquid layer.

Other features of the present invention will result from the following detailed description of some specific embodiments thereof.

Preferred embodiments of the present invention will be hereinafter described, with reference to the accompanying drawings, given merely by way of example, and in which:

Fig. 1 is an elevational view of a series of hollow bodies arranged in juxtaposition, prior to the pouring of the concrete;

Fig. 2 is a sectional view on the broken line II—II of Fig. 1 and it shows the hollow bodies, the concrete wall elements, formed on either side of these hollow bodies, and finally the strutting pieces extending between these two wall elements;

Fig. 3 is a perspective view of a strutting piece made according to a first embodiment of the present invention;

Fig. 4 is an elevational view, partly in section, of a porous and hollow brick the corners of which are cut off, for use in connection with the present invention;

Fig. 5 is a cross sectional view of the brick of Fig. 4;

Fig. 6 is a perspective view of another embodiment of a strutting piece made according to the present invention;

Fig. 7 shows a portion of the hydraulic screen formed by means of hollow bodies or bricks with two series of perpendicular channels;

Fig. 8 is a horizontal section of a portion of the wall;

Fig. 9 is a horizontal section of two adjacent bricks or hollow bodies having rounded edges;

Figs. 10 and 11 are horizontal sectional views of two other embodiments of such hollow bodies or bricks, respectively;

Fig. 12 is a vertical sectional view of hollow bodies having grooved edges;

Fig. 13 is a sectional view of a modification in which the edge of the hollow bodies is of bevelled-shape;

Fig. 14 is an elevational view of a hollow body the edge of which is bevelled;

Fig. 15 is a vertical sectional view of hollow bodies having rounded edges, to be used for joining a vertical wall with a horizontal wall;

Fig. 16 is a partial sectional view illustrating the construction of a floor or a ceiling according to the invention.

In the example shown by Figs. 1 and 2, the wall of the tank includes three layers: an inner layer consisting of hollow and porous bricks 1 arranged in adjoining lines, so that their channels $1a$ are in line with one another and form continuous tubes which are kept full of water, for instance by means of reservoirs connected with said channels and located at the top of the tank, and two layers of reinforced concrete 3 and 2, formed on either side of these bricks and which constitute the internal and external faces of the tank, respectively.

These bricks are, as a rule, set in position by successive rows at the same time as the reinforcing members 4 of the two concrete layers, or before and after the pouring of the concrete. For the floor, the cupolas, and generally all the wall elements which are substantially horizontals, the bricks are placed upon the fresh concrete which constitutes the lower face of the wall, immediately after pouring of this concrete.

The reinforcing members 4 of the two layers are connected together by strutting pieces which are prepared in advance and set in position at the same time as the bricks.

In the embodiment of Fig. 3, each strutting piece includes a metallic bar 5 of suitable section for withstanding the stresses to be developed and provided at its ends with anchoring hooks to be engaged on reinforcing members 4.

The median portions of these bars 5 are embedded, over a length substantially equal to the thickness of the layer of hollow bodies through which they pass, with a surrounding mass 6 made of a product which is both strong and porous, such as a concrete made by means of very fine gravel, of very uniform grain, cement and or terra-cotta.

The angles of the hollow bodies are cut off (see Fig. 4) and when they are assembled these hollow bodies leave between them passages 7 of polygonal (square in the example) section corresponding to the section of the surrounding masses 6.

The strutting pieces being arranged in passages 7, in such manner that their masses 6 fit tightly in said passages, it is clear that the two concrete layers are perfectly interconnected so that stresses are transmitted from one to the other through said strutting pieces, without said pieces involving the presence of leaks through which the concrete poured on the bricks would pass in sufficient amounts for clogging the channels, thus preventing the formation of a continuous layer of water impregnated matter inside the tank wall.

Furthermore, the masses 6 of the strutting pieces are in contact with the water present in the channels (see Fig. 4) and, owing to their porosity, they are impregnated with water as far as the metal bar, which prevents leakage of hydrocarbon through said masses 6.

The embodiment shown by Fig. 6 differs from that above described by the provision, inside the surrounding mass 6, of a metallic plate 8 having an outline corresponding substantially to the cross section of said mass. This plate, which may be welded to the metallic bar of the strutting piece, prevents leakage of the hydrocarbon through mass 6, so that the latter can be made of a concrete as strong as it is desired, without having to bother about its porosity.

In order to obtain under all circumstances the continuity of the fluid tight liquid screen, we may provide in the hollow bodies, as shown by Fig. 7, a supplementary series of channels $1b$, extending for instance horizontally and intersecting the vertical channels $1a$. With this arrangement, if a channel $1a$ clogged for instance at $x$, the upper and lower portions of the channels are nevertheless connected together by channels $1b$ and the adjacent vertical channels and the fluid-tightness of the tank is not reduced. Hollow bodies with a double series of channels are therefore particularly advantageous when it is desired to obtain fluid-tight tanks which ensure a perfect safety.

The intercommunication of the channels permits of employing the imbricate arrangement of the hollow bodies, as shown by Fig. 7, according to the usual method utilized in construction for obtaining a better cohesion of the system of hollow bodies and an excellent joining of the vertical edges of these bodies. This is due to the fact that the bodies are kept in perfect mutual bearing connection with one another by the weight of the upper hollow bodies which overlap the line of junction of the lower bodies. As all the channels and portions of channels communicate together, this arrangement cannot involve any drawback.

In order to permit of employing this arrangement, some of the hollow bodies have a strutting piece passing across the middle of one of their sides (see on Fig. 7 the hollow body shown in heavy lines) which is fitted with a notch for this purpose.

The plan view of Fig. 8 shows that, in tanks of curved horizontal section, the hollow bodies make, with one another, a certain angle which depends upon the radius of curvature of this section. If this radius of curvature is very great, the angle is negligible and it is possible to make use of hollow bodies of rectangular horizontal section, but otherwise, concrete might leak between the edges of the hollow bodies. In order to obviate this drawback, it is advantageous to provide means for ensuring a nearly perfect joining of the respective vertical edges of the hollow bodies.

For this purpose, according to the present invention, the hollow bodies may be made in such manner that their edges fit in one another. The preferable solution consists in giving these edges the shape of alternately convex and concave cylinder elements 9, as shown by Fig. 9.

Hollow bodies of this kind permit of making all kinds of walls, whatever be the radius of curvature thereof.

A given hollow body may be provided on one side with a convex edge and on the opposite side with a concave edge, as in the case of Fig. 9, the hollow bodies being then identical to one another. Alternately, we may make use of hollow bodies having two concave edges $9a$ (Fig. 10) and other hollow bodies having two convex edges $9b$ (Fig. 11).

Advantageously, the radius of curvature of the convex edges is slightly greater than that of the concave faces, as shown by Fig. 9. Under these conditions, there is formed between two adjoining hollow bodies a recess 10 the section of which is that of a meniscus. This recess is filled with liquid and ensures a communication between the horizontal channels, even when said channels are not located exactly in line with one another. A similar advantage can be obtained, if so desired, for the vertical channels by giving also alternately concave and convex curvatures to the horizontal edges of the hollow bodies.

However, on the horizontal edges, which bear upon one another along horizontal planes, it suffices to provide a groove 9c, as diagrammatically shown by Fig. 12.

Another arrangement permitting obtaining a good joint in the case of small radii of curvature, would consist in bevelling the edges of the hollow bodies (as shown by Figs. 13 and 14). However, this solution has, with respect to the preceding one, the disadvantage that the bevel angle and the size of the hollow bodies will be different according to the radius of curvature of the tank wall. Nevertheless, this arrangement may be advantageous when the tank is of angular section, for instance for joining a horizontal wall with a vertical wall in a gradual manner.

However, for joining such wall elements, it is more advantageous to have recourse to hollow bodies having curved edges of given inclination, which permit, so to speak, of hingedly connecting the respective hollow bodies, as shown by Fig. 15, which illustrates two angular connections α and β.

For the same purpose as above stated, it is advantageous to give the convex edges a radius of curvature slightly greater than that of the concave edges.

If the tank is of circular section, the oblique hollow bodies intermediate between the cylindrical vertical wall and the plane horizontal wall may be given the shape of sectors, same as the hollow bodies intended to provide a liquid screen on the inside of the horizontal wall.

The arrangement of the hollow bodies and of the strutting pieces in a horizontal wall involves some difficulties which can be avoided by replacing, in the whole or merely a part of the horizontal wall, the hollow bodies moulded in advance by a bed of small stones or gravel 12 (Fig. 16) placed on the lower concrete layer 13, formed in advance, and which surrounds the lower end of the strutting pieces. In order to prevent the upper concrete layer 14, which is subsequently poured, from penetrating into the interstices between the gravel elements or pebbles, the bed may be made of several layers, superposed and made of pebbles of a size which decreases from bottom to top, with a layer of fine gravel or sand at the top.

In a general manner, while we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the accompanying claims.

What we claim is:

1. A tank of the type described which comprises, in combination, two parallel wall elements of concrete, an intermediate layer constituted by hollow porous bodies and adapted to be filled with an impregnating liquid, interposed between said concrete wall elements, and strutting means interconnecting said two wall elements extending through said intermediate layer, fitting accurately in holes provided in said intermediate layer.

2. A tank of the type described which comprises, in combination, two parallel wall elements of concrete, an intermediate layer interposed between said concrete wall elements, constituted by a plurality of juxtaposed hollow porous bodies adapted to be filled with an impregnating liquid and provided with passages extending therethrough transversely to said wall elements, and strutting means between said two wall elements, said strutting means consisting of metal bars extending from one wall element to the other one and a mass of matter surrounding the middle part of each metal part and fitting exactly in one of these passages, respectively.

3. A tank of the type described which comprises, in combination, two parallel wall elements of concrete, an intermediate layer interposed between said concrete wall elements, constituted by a plurality of juxtaposed hollow porous bodies adapted to be filled with an impregnating liquid and provided with passages extending therethrough transversely to said wall elements, and strutting means between said wall elements, said strutting means consisting of metal rods extending from one wall element to the other and a mass of porous matter surrounding each of said metal rods in the middle part thereof and fitting exactly in one of said passages, respectively.

4. A tank of the type described, which comprises, in combination, two parallel wall elements of concrete, an intermediate layer interposed between said concrete wall elements, constituted by a plurality of juxtaposed hollow porous bodies adapted to be filled with an impregnating liquid and provided with passages extending therethrough transversely to said wall elements, and strutting means between said wall elements, said strutting means consisting of metal rods extending from one wall element to the other one, a plate rigid with said rod adapted to fit transversely in an accurate manner in one of said passages, respectively, said plate being made of a hard impervious material, and a mass of matter, of a section corresponding exactly to the outline of said plate, surrounding at least the intermediate part of said rod.

5. A tank according to claim 2 in which said mass surrounding each metal bar is made of terra cotta.

6. A tank of the type described which comprises, in combination, two parallel wall elements of concrete, and an intermediate layer interposed between said concrete wall elements, made of a porous material and provided with two series of channels which intersect one another and which are adapted to be filled with an impregnating liquid, whereby, in case of clogging of one channel at a point thereof, the two portions of said channel on respective sides of said point are interconnected through other channels.

7. A tank of the type described which comprises, in combination, two parallel wall elements of concrete, and an intermediate layer interposed between said concrete wall elements, made of a porous material and provided with two series of channels at right angles to one another and intersecting one another, said channels being adapted to be filled with a liquid which impregnates said intermediate layer, whereby, in case of clogging of one channel at a point thereof, the two portions of said channel on opposite sides of said point are interconnected through other channels.

8. A tank of the type described which comprises, in combination, two parallel wall elements of concrete, and an intermediate layer interposed between said concrete wall elements, made of a porous material and adapted to be filled with an impregnating liquid, said tank including a horizontal part in which said intermediate layer consists of a bed of fragmentary hard material interposed between two layers of concrete.

9. A tank of the type described which comprises, in combination, two parallel wall elements of concrete, and an intermediate layer interposed between said concrete wall elements, made of a porous material and adapted to be filled with an impregnating liquid, said tank including a horizontal part in which said intermediate layer consists of a bed of fragmentary hard material the size of the grains of which increases gradually from top to bottom, and a layer of fine fragmentary material such as sand at the top of said bed.

LOUIS PIERRE BRICE.
JEAN LIPSKY.